United States Patent [19]
Brock

[11] 3,829,775
[45] Aug. 13, 1974

[54] METER WITH ELECTRICALLY SELECTABLE SCALES

[76] Inventor: Gordon L. Brock, 20701 Beach Blvd., Space No. 31, Huntington Beach, Calif. 92648

[22] Filed: Jan. 22, 1973

[21] Appl. No.: 325,571

Related U.S. Application Data

[63] Continuation-in-part of Ser. No. 221,667, Jan. 28, 1972, abandoned.

[52] U.S. Cl. .............................. 324/115, 324/99 R
[51] Int. Cl. ..................... G01r 15/08, G01r 17/06
[58] Field of Search ......................... 324/115, 99 R

[56] References Cited
UNITED STATES PATENTS

| | | | |
|---|---|---|---|
| 408,157 | 7/1889 | Barrett | 324/115 |
| 2,101,296 | 7/1937 | Simpson et al. | 324/115 |
| 2,103,606 | 12/1937 | Abrahamson et al. | 324/115 |
| 3,440,537 | 4/1969 | Warner et al. | 324/99 R |
| 3,704,417 | 11/1972 | Davis | 324/99 R |

Primary Examiner—Alfred E. Smith
Assistant Examiner—Ernest F. Karlsen
Attorney, Agent, or Firm—Spensley, Horn & Lubitz

[57] ABSTRACT

A meter with electrically selectable scales which allows the remote selection of both the electrical signals to be measured and the corresponding scale on which the measurement is to be made. The indicating mechanism is comprised of a band transparent at one end and partially opaque at the other end. The junction between the transparent and opaque areas serves as a pointer or indicator. A spring take-up means at one end of the band maintains the band in tension and a servo drive take-up system at the other end of the band moves the band in unison with a feedback potentiometer to balance a bridge network. A cylindrical member located behind the band contains a plurality of scales thereon. A drive motor rotates the cylinder about its axis, with a solenoid locking the cylinder at the electrically selected scale and de-energizing the drive motor. The selection of electrical signals to be measured and the appropriate scale for its measurement are selected in unison through a gang switch which may be remotely located. An alternate embodiment utilizing a single drive motor for both the cylindrical members and the band is disclosed.

10 Claims, 23 Drawing Figures

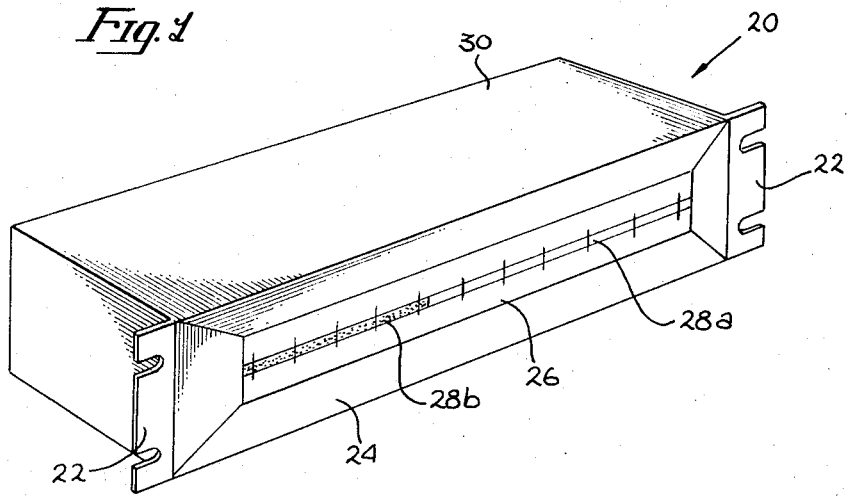
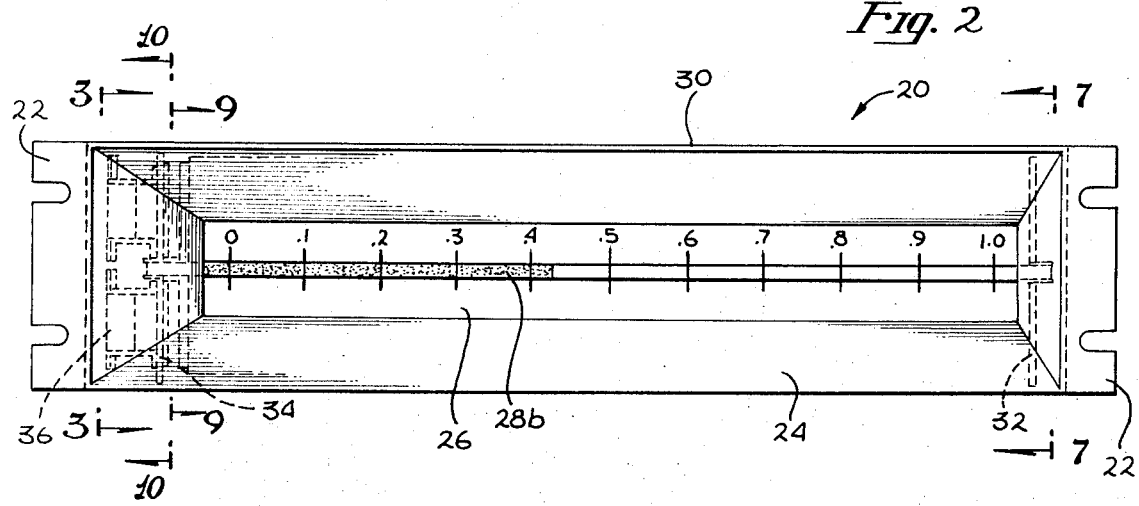
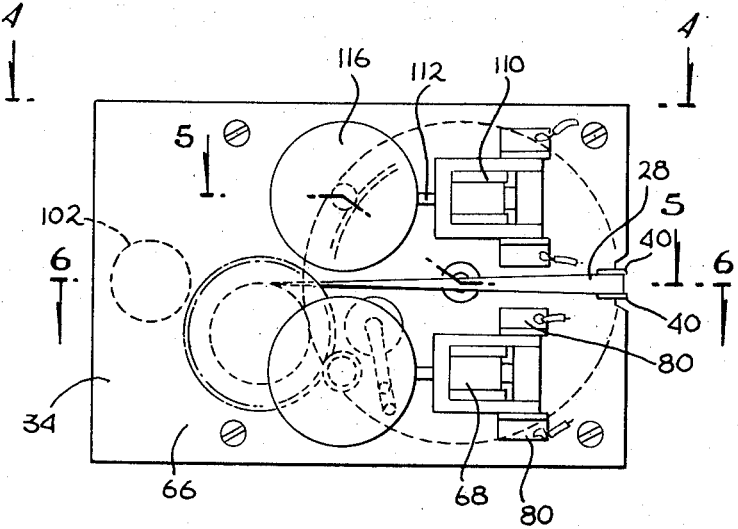

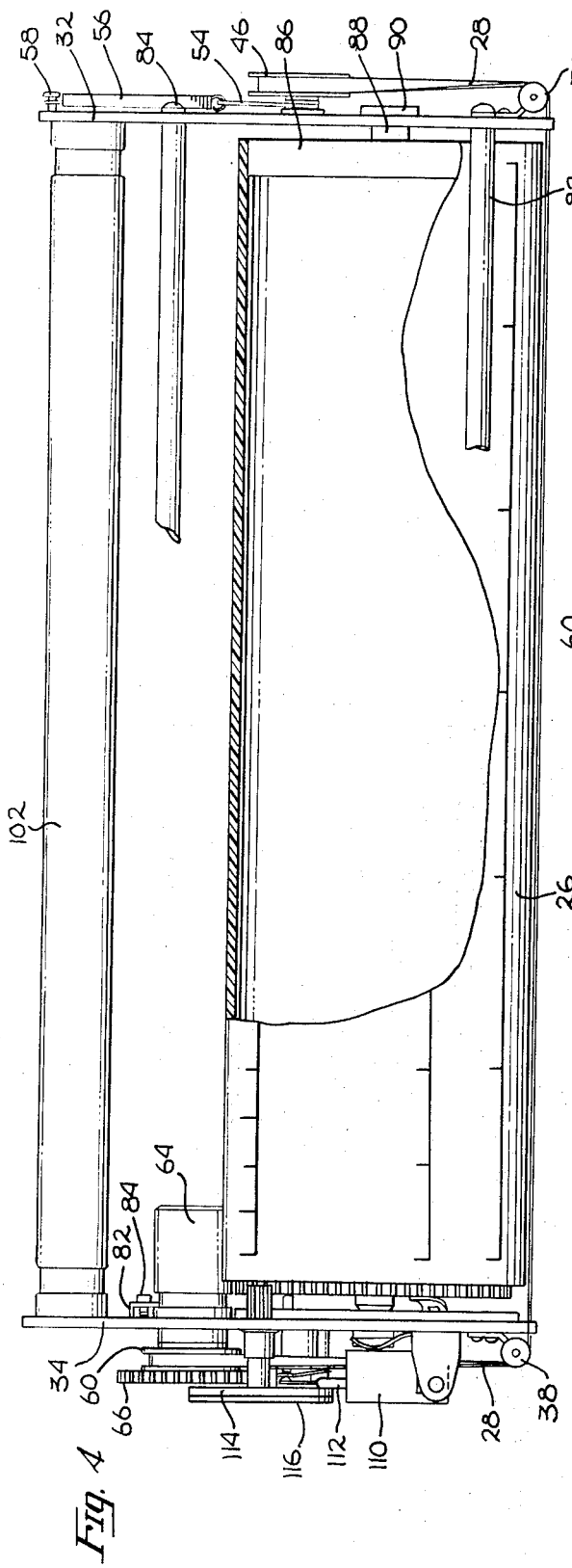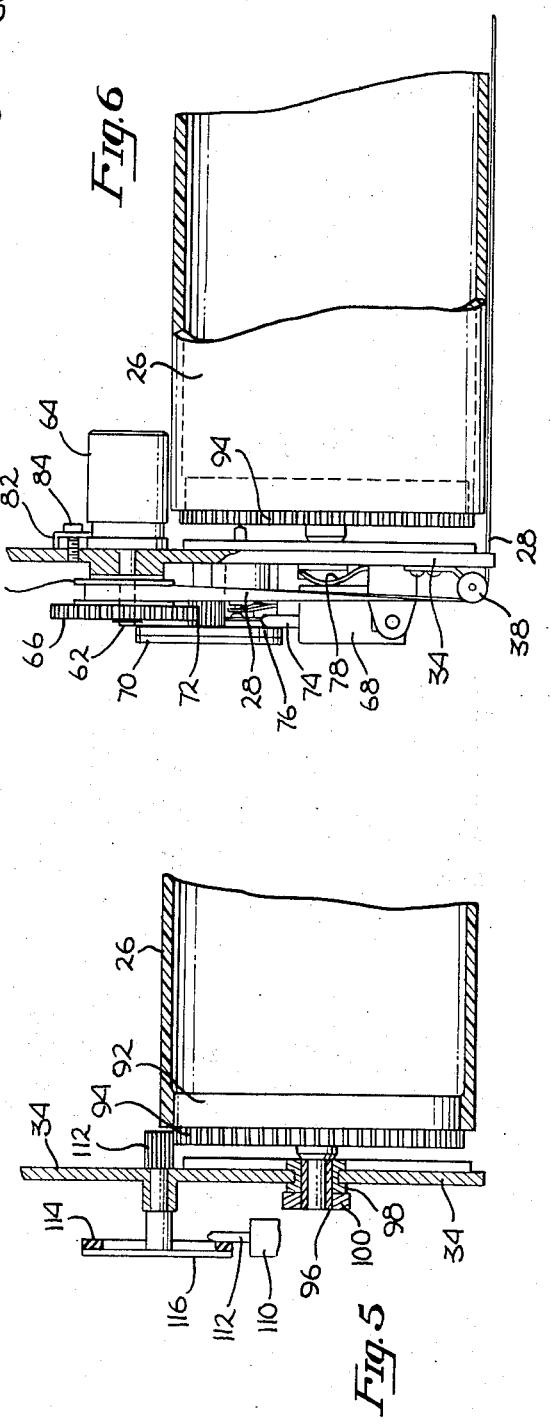

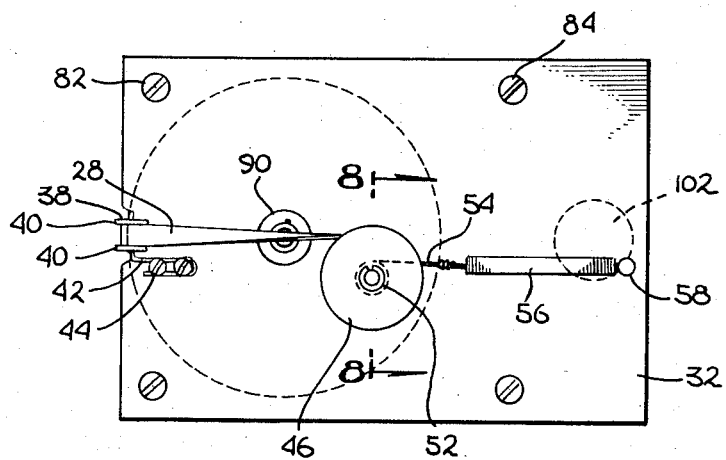
Fig. 7
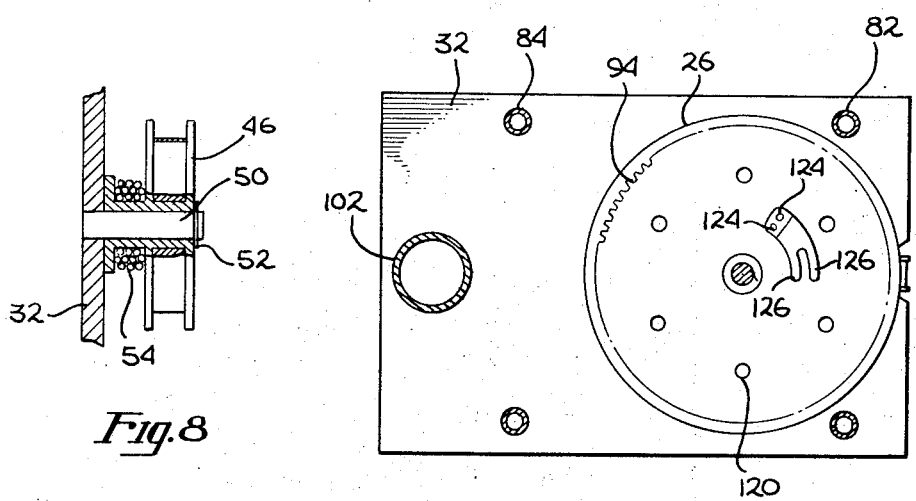
Fig. 8
Fig. 9
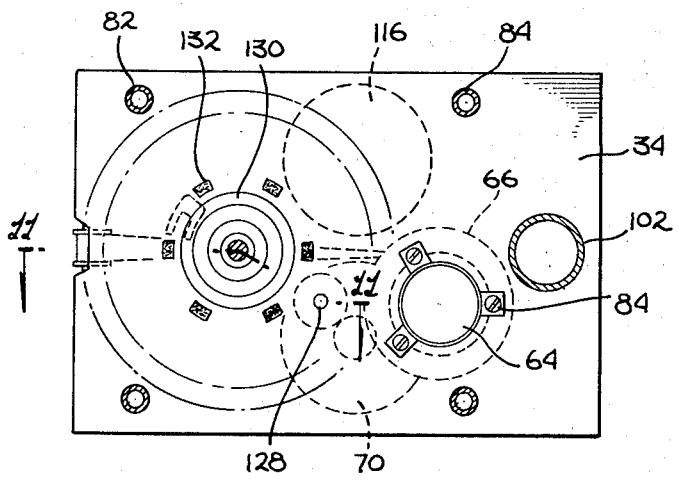
Fig. 10

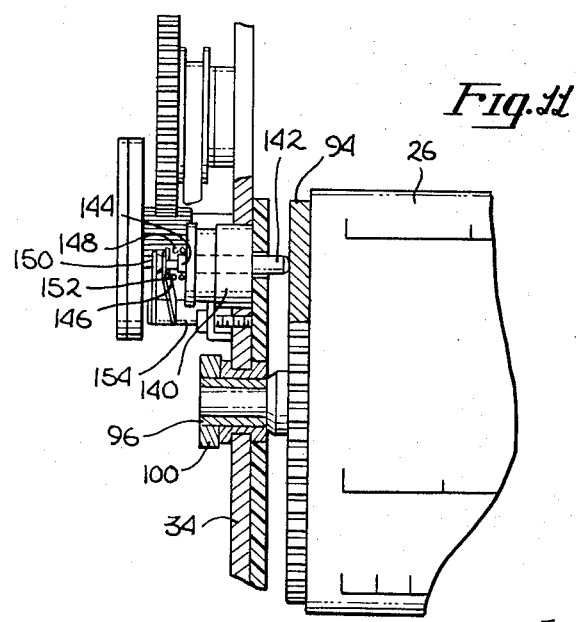
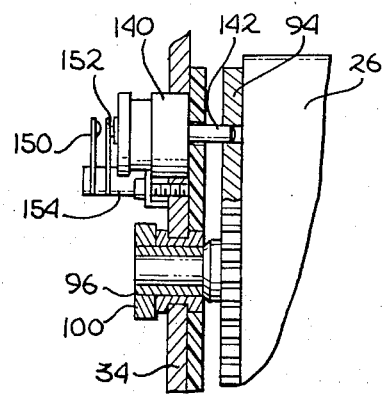
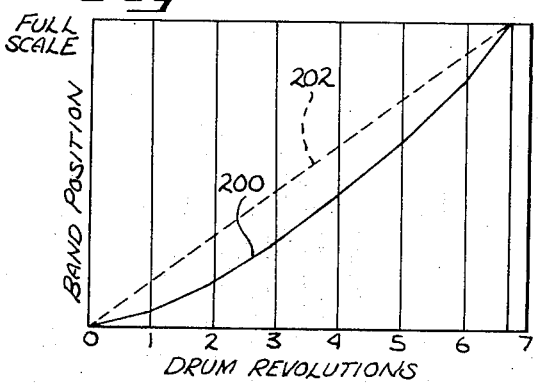
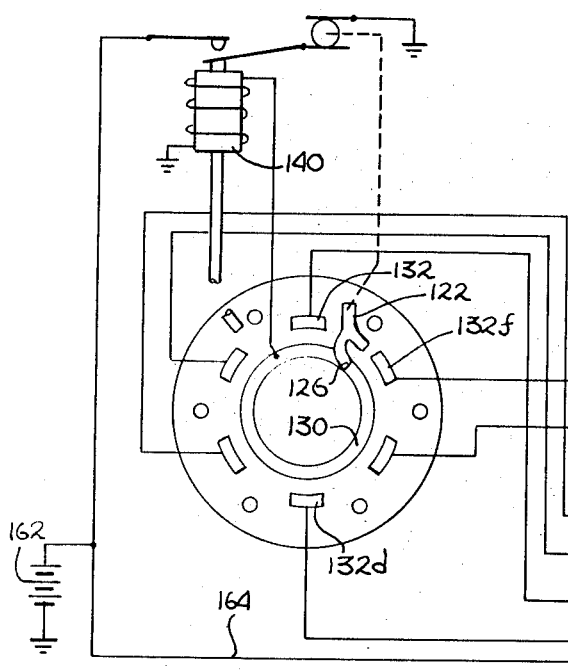
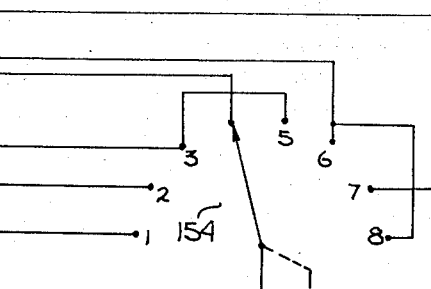
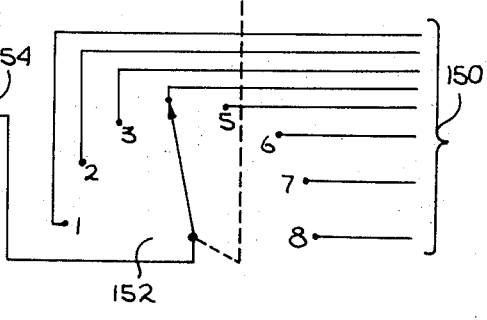

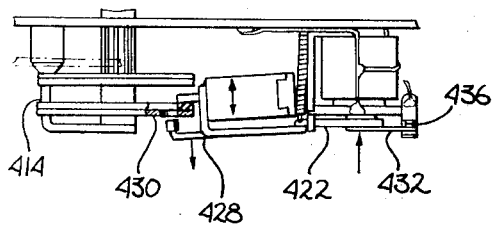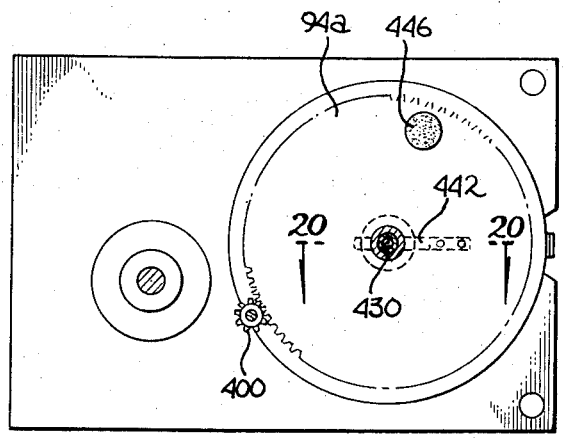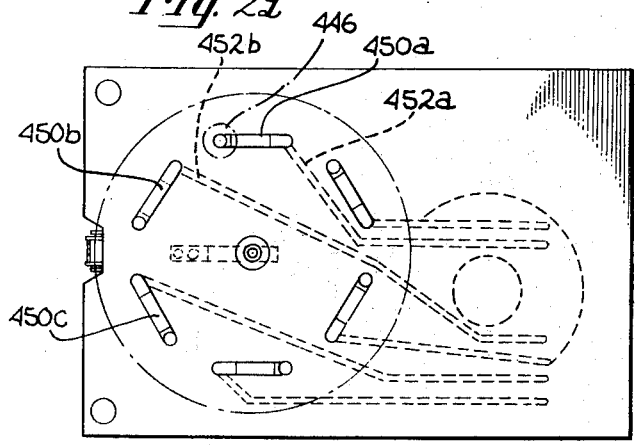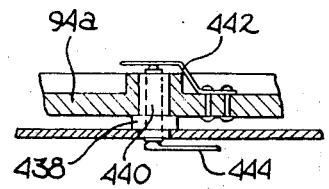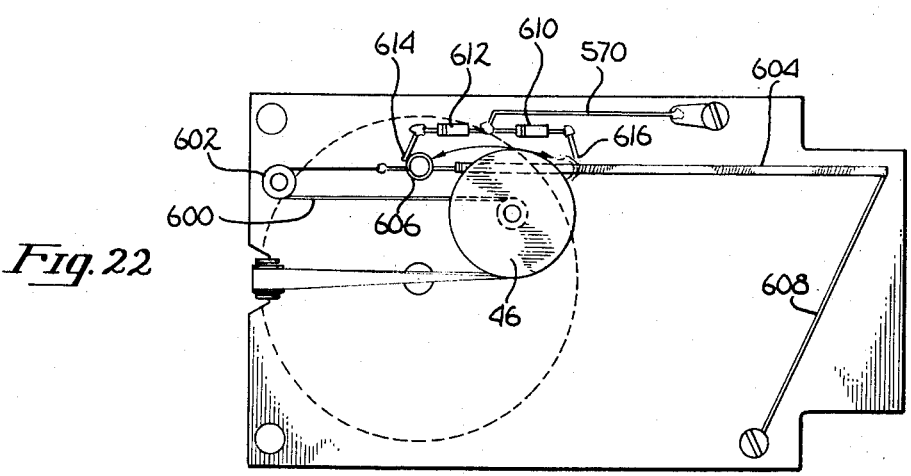

METER WITH ELECTRICALLY SELECTABLE SCALES

This is a continuation-in-part application of my pending application Ser. No. 221,667 filed Jan. 28, 1972, now abandoned.

BACKGROUND OF THE INVENTION

1. Field of the Invention

This invention relates to the field of electromechanical devices for the visual indication of electrical signals, and more particularly, to measuring instruments having a plurality of scales for the measurement of various types of electrical signals.

2. Prior Art

Various types of meters for the visual indication of electrical signals are well-known in the prior art. These meters may be classified in a variety of ways. By way of example, the basic meter movement in the vast majority of prior art meters is either a D'Arsonval movement or a servo driven movement. The scales used may be single scales, multiple scales located on the same plate and all disposed so as to be readable in conjunction with the indicating means, or a plurality of scales on an equal number of plates which may be mechanically moved into position with respect to the indicating means by a mechanical drive system manually manipulated by the operator.

A D'Arsonval movement consists of a coil of wire having a needle or other indicating means attached thereto, pivotally mounted with respect to a magnetic field created by a stationary permanent magnet. The coil and magnetic field are arranged so that a current through the coil causes a torque on the coil, thereby urging the coil in rotation on a pair of pivots. This torque is generally restrained by a pair of hair springs, similar to the hair springs used in watches, so that the total angular deflection is generally proportional from the current through the coil. Since a current must be supplied to the moving coil in some manner, typically the hair springs are also used as flex leads so as to provide substantially frictionless electrical contact to the moving coil. Friction, of course, is encountered in the pivot and, therefore, to minimize hysteresis and stiction pivots of a minimum physical size are characteristically used.

One of the problems with D'Arsonval movements is that they are readily damaged by extended vibrations and physical abuse. Of course, their susceptibility to physical abuse may be decreased by increasing the size and durability of the pivot suspension system, though an associated increase in friction thereby results. In a few of the newest D'Arsonval movements, the indicating needle is suspended by two opposed flat bands pulling against each other along the axis of rotation. The use of the flat bands allows a substantial cross-sectional area in the bands without an attendant high torsional spring rate, and provides compliance in the needle and coil suspension so as to be more resistant to physical abuse. Such systems, however, are not as easily packaged and tend to be more expensive than the more conventional pivot-hair spring arrangement.

Another problem with D'Arsonval movements, independent of the suspension system used, is that the basic movement results in a rotation of some indicating means about an axis; that is to say, the moving coil in all D'Arsonval movements is adapted for rotation about an axis, generally perpendicular to the central axis of the coil, and the indication of movement is derived by a needle or other indicating object directed generally radially from the axis of rotation and disposed adjacent an appropriate indicating scale. Therefore, in many applications, a meter utilizing a D'Arsonval movement is not readily packagable to result in a large, yet easy to read scale. By way of example, fuel gauges and temperature gauges as commonly used in automobiles are readily packagable within the dashboard since the area used for visual indication is generally small and there is ample room to displace the axis of rotation of the moving coil substantially away from the indicating scale. However, in meters in which a more accurate indication is required, a much larger scale must be used with the indicia disposed in an arc in conformance with the swing of the needle or indicating bar. Consequently, in those meters in which a flat scale is used with a pointer projecting radially from the axis of rotation of the moving coil, the meter tends to have a square or fan shaped frontal area and is not easily packaged in a panel nor easily read from any distance because of the sharpness of the needle required to provide the desired accuracy in the reading. Some meters using D'Arsonval movements use a curved scale, that is, a scale located on a plate which is curved so as to form a part of an arc of a cylinder having its axis coincident with the axis of rotation of the moving coil, with an indicator projecting first radially outward from the axis of the moving coil and then longitudinally parallel to the axis of the moving coil just above the surface of the scale. This type of meter is easier to package in that the required mounting area for the meter is only slightly larger than the scale itself, the additional frontal area required for the movement using a flat scale having been changed to a depth requirement. However, such meters are also not easily read from a distance, particularly if being read at an angle, since paralax may become extreme depending on the needle position and the position of the person reading the meter.

Servo driven meters are generally superior to meters using D'Arsonval movements both in accuracy and in the ability to package the meter so as to be more easily read from a distance. These meters generally have a pointer adjacent a scale and mounted on a slide, with a cable or other driven system to drive the pointer and a follow-up potentiometer in response to the error signal in the servo follow-up system. Such devices, however, as are presently available on the market are mechanically complicated devices and tend to be expensive to purchase and to maintain in normal use.

Meters having a single face with a plurality of scales thereon provide for the measurement of a plurality of parameters through the use of the appropriate scale. However, such scales are very easily misread by a momentary confusion of the scales so as to provide a very substantial opportunity for error in any individual reading or series of readings. Furthermore, particularly in the D'Arsonval movement where the flat scale is used, the scale located at the smaller arc becomes highly compressed, inaccurate and difficult to read. In any event, none of the scales may be read at any substantial distance because of the close examination of the multiple scale presentation required to obtain the desired reading.

Some of the problems discussed above with respect to multiple scales on a single scale plate have been alleviated in some prior art meters by providing a mechanical system or physically interchanging scale plates, each having a single scale thereon, in response to a rotary selector on the front of the meter. Thus, when the control on the front of the meter is rotated to change from the measurement of one parameter to the measurement of another parameter, the scales are likewise changed in response thereto. Typically, a rotary switch is used to switch the interconnection to the meter movement, and a gear-mechanical linkage assembly is driven in unison therewith to physically move the scales. This type of system, however, is mechanically complex, generally involves the movement of scales in a direction which is non-orthogonal to the needle movement so as to cause an error if the scales are not accurately located repeatably and in relation to each other, and require a mechanical connection between the switch selecting the parameter to be measured and the scale moving apparatus, thereby foreclosing any reasonable possibility of remote selection of the parameter and associated scale.

In all of the prior art meters using a mechanical indicating means in some form, the indicating means such as a needle pointer or the like is disposed adjacent to, but displaced from the associated scale. Consequently, there may be a substantial paralax and error in reading as a result thereof.

There is, therefore, a need for a low cost, accurate, easily read and easily packaged meter which has a plurality of scales, any of which may be remotely selected in accordance with the remote selection of the parameter to be measured and in a manner which may not cause a scale alignment error, and which has substantially no paralax when viewed from any reasonable angle.

BRIEF SUMMARY OF THE INVENTION

A servo driven meter with electrically selectable scales which allows the remote selection of both the electrical signals to be measured and the corresponding scale on which the measurement is to be made. The indicating mechanism is comprised of a horizontal band which is transparent at one end and partially opaque at the other end and adapted for horizontal motion over the face of a scale. The junction between the transparent and opaque areas serves as a pointer or indicator, with the indicia being visible through both the transparent and the opaque area, to aid in interpolation between indicia. A spring takeup means at one end of the band maintains the band in tension, and a servo drive takeup system at the other end of the band moves the band in unison with a feedback potentiometer to balance a bridge network. A cylindrical member located behind the band contains a plurality of scales thereon, having minimum and maximum scale readings located on first and second planes, respectively, both of which are perpendicular to the axis of the cylindrical member. A drivemotor rotates the cylinder about its axis, with a solenoid being mechanically and electrically adapted to lock the cylindrical member at the electrically selected scale and to de-energize the drive motor. The selection of electrical signals to be measured and the appropriate scale for its measurement are selected in unison through a gang switch which may be remotely located. The basic drive mechanism results in a slight nonlinearity due to the accumulation of the band on a drum mounted on the feedback potentiometer, and various means of eliminating the nonlinearity are disclosed.

An alternate embodiment of the present invention is also disclosed whereby a drive motor is attached to the moving member of a relay and is electrically interconnected so that upon selection of a signal and scale to be measured, the motor is first deflected to a position so as to drive the cylinder member to the proper position for displaying the desired scale, and then is deflected to a second position so as to drive the band drive means to display the proper measurement of the signal being measured.

BRIEF DESCRIPTION OF THE DRAWINGS

FIG. 1 is a perspective view of one embodiment of the present invention meter.

FIG. 2 is a front view of the meter of FIG. 1.

FIG. 3 is an end view of the meter mechanism taken along lines 3—3 of FIG. 2.

FIG. 4 is a top view of the meter mechanism taken along lines 4—4 of FIG. 3.

FIG. 5 is a partial cross-sectional view of the servo drive mechanism taken along broken line 5—5 of FIG. 3.

FIG. 6 is a partial cross-sectional view of the meter mechanism taken along lines 6—6 of FIG. 3.

FIG. 7 is the other end view of the meter mechanism taken along lines 7—7 of FIG. 2.

FIG. 8 is a partial cross-sectional view of the band takeup roller taken along lines 8—8 of FIG. 7.

FIG. 9 is a cross-sectional view taken along lines 9—9 of FIG. 2.

FIG. 10 is a cross-sectional view taken along lines 10—10 of FIG. 2.

FIG. 11 is a partial cross-sectional view taken along lines 11—11 of FIG. 10.

FIG. 12 is a portion of the cross-sectional view of FIG. 11 showing the solenoid plunger engaging a mating hole in the cylindrical member.

FIG. 13 is a circuit diagram of the band and cylindrical member drive mechanisms.

FIG. 14 is a graphical representation, on an exaggerated scale, illustrating the nature of the potential nonlinearity of the band drive mechanism in the meter of the present invention.

FIG. 18 is the same view as that of FIG. 17 with the relay and motor in the actuated position for driving the cylindrical members to display a new scale.

FIG. 19 is a partial cross-sectional view looking at the end of the cylindrical member taken along the lines 19—19 of FIG. 16.

FIG. 20 is a partial cross-sectional view showing the central area of the drive end of the cylindrical member.

FIG. 21 is a view taken along the lines 21—21 of FIG. 16.

FIG. 22 is a view of the second end of the alternate embodiment showing the tape drive limiting means.

DETAILED DESCRIPTION OF THE INVENTION

Figure 15:
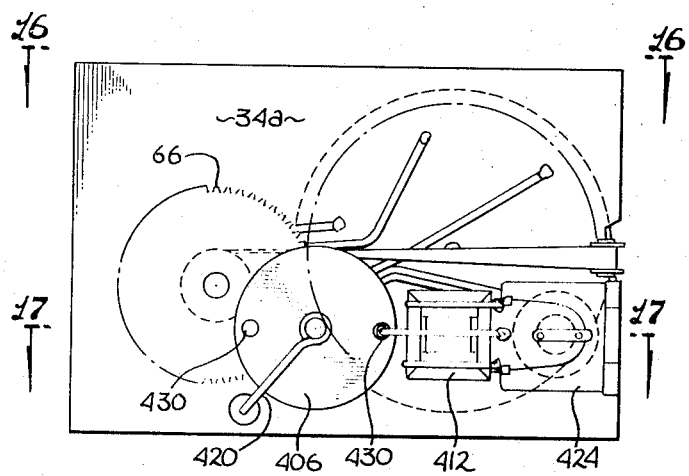
FIG. 15 is an end view of an alternate embodiment of the meter mechanism similar to the view of FIG. 3.

First referring to FIG. 1, a perspective view of one embodiment of the meter of the present invention may be seen. In this view the meter, generally indicated by the numeral 20, is adapted for panel mounting and has a pair of mounting flanges 22 substantially coplanar with the face thereof for mounting in a rack of conventional design. The meter shown is adapted for remote control, in a manner which shall be subsequently described, and to be provided with electrical power by the main on/off switch of the electronic system in which it is used. Consequently, there are no control knobs, on/off switches and the like on the face of the meter of this embodiment.

The front of the meter has a decorative rectangular member 24 with a central elongated window therein through which a scale on member 26 may be seen. The elongated window may be covered with a glass or clear plastic member so as to prevent the passage of moisture and contamination into the meter. A horizontal band, generally centrally disposed within the elongated window, has a transparent portion 28a extending to the right hand termination of the elongated window, and a colored, partially opaque portion 28b extending from the junction with the transparent portion to the left hand extreme of the elongated window (the entire tape being hereafter generally identified by the numeral 28). As shall be subsequently described, the tape is servo driven so that the junction between the transparent portion and the partially opaque portion moves along the scale displayed through the window in response to the electrical signal being measured by the meter. The overall configuration of the meter is generally rectangular, having a rearward protruding section 30 housing the mechanism of the meter. The various other mechanical details of the housing and mounting of the meter mechanism to the housing are all well known in the instrument art and thus are not described in detail herein.

Now referring to FIG. 2, a front view of the meter 20 of FIG. 1 may be seen. In this view it will be noted that the scale located on member 26 is generally viewable through the colored portion of the band 28b so that a person reading the meter may readily interpolate between the divisions on a scale on member 26. Also shown in phantom in FIG. 2 are the edges of members 32 and 34, and the various drive mechanisms and the like mounted on member 34.

The general arrangement of the band 28 and the drive therefore may be seen in FIGS. 3, 4, 6, 7 and 8. FIG. 3 is a side view of the meter taken along lines 3—3 of FIG. 2, showing many of the details of the drive mechanism. FIG. 7 is a side view of the other side of the meter taken along lines 7—7 of FIG. 3. FIG. 4 is a top view of the meter taken along lines 4—4 of FIG. 3. FIG. 6 is a partial cross-sectional view taken along lines 6—6 of FIG. 3, and FIG. 8 is a partial cross-sectional view taken along lines 8—8 of FIG. 7. From the various figures, and particularly FIG. 4, it may be seen that the band 28 is disposed horizontally, substantially in contact with member 26, and is supported and guided at a position adjacent each end of the member 26 by a pair of grooved rollers 38. As may be best seen in FIGS. 3 and 7, each of the rollers 38 have a central cylindrical area on which the band 28 rests, and a flange 40 at each end of the roller to provide for retention of the bands in the desired position. Each of the rollers 38 is mounted on a roller support 42 attached to the respective members 32 and 34 by a pair of screws 44. The roller support 42 is formed from a heavy wire, with the screws engaging a U-shaped portion of the support so as to allow adjustment of the fore and aft position of the rollers to adjust the relative position of the tape with respect to the surface of member 26, thereby assuring that the band is substantially in contact with member 26 to avoid the problem of paralax, but is not causing undue friction therewith.

At the right end of the meter mechanism, as may be seen in FIG. 7, the band 28 is wound around a grooved pulley 46 a number of times with the end of the band being attached to the pulley. Integral with the pulley, as may be seen in FIG. 8, is a second pulley-like region 48, with the entire pulley assembly being rotatably mounted to member 32 by a pin 50 and being retained thereon by a snap ring 52. Attached to pulley-like member 48 and wound therearound is a cord 54, which is also attached to one end of tension spring 56. The other end of the tension spring is attached by a screw 58 to member 32. Thus the tension spring yieldably urges the pulley assembly into rotation about the pin 50 so as to roll up and dispense band 28 in response to the drive of the band at the other end thereof, and to maintain a substantially constant tension on the band to keep the band disposed in the desired position.

Now referring specifically to FIGS. 3 and 6, details of the band drive mechanism may be seen. The driven end of band 28 is attached to a flanged roller 60 so as to be retracted and dispensed in accordance with rotation of the roller. The roller 60 is rigidly attached to shaft 62 of a ten turn potentiometer 64 and is driven in rotation by a gear 66 integral therewith. Gear 66 is driven by a permanent magnet DC motor 68 through a disc 70, rotatably mounted to member 34 and having integral therewith a pinion 72 mating with the gear 66. The motor 68 drives disc 70 in rotation through a friction drive by the contact of shaft 74 with a high friction member 76 attached to the face of the disc 70. The particular motor used in the preferred embodiment is supported through its brush holders by members 80 so as to pivotally support the brush end of the motor about a vertical axis and simultaneously provide a means for making electrical contact to the two motor connections. Controlled pressure for the friction drive between shaft 74 and the friction drive member 76 is maintained by a leaf-spring 78 attached to member 34, yieldably encouraging the shaft end of the motor to an outward disposition.

In the preferred embodiment the scales on member 26 are each 10 inches long by approximately 1 inch high, and the diameter of the grooved roller 60 is chosen so that the initial turn of roller 60 causes a progression of the band 28 of 1½ inches (e.g., diameter slightly less than one-half of an inch). Thus, for the 10 inch scale, slightly less than seven turns of the roller 60 are required to move the junction between the opaque and clear portion of the band the full length of the scale. Consequently, potentiometer 74, which is the feed back potentiometer for the servo drive system, has a range (e.g., ten turns) exceeding the full scale movement of band 28 so as to allow the junction between the colored and opaque portion to move off scale in the event of a signal exceeding the full scale range of the meter. The potentiometer 64 is mounted to member 34 through clamps 82 by the screws 84, which may be loosened to allow rotation of the housing of potentiometer 64 so as to zero the potentiometer when the band is at the zero position on the scale. This may be accomplished by shorting the input to the meter and rotating the case of the potentiometer, allowing the servo system (electrical details of which shall be subsequently described) to follow the rotation of the case to zero the meter.

In the preferred embodiment the material used for band 28 is a mylar strip having a thickness of two-thousandths of an inch. Thus, it may be seen that as the band 28 is rolled up on roller 60, the apparent diameter of the roller is increased for each turn by twice the thickness of the mylar. Thus, the circumference of the roller also increases proportionately, resulting in a change in band motion per turn of the roller, depending upon the number of turns on the band already on the roller, e.g., depending upon whether the meter is reading towards full scale or towards the zero position. This change, of course, is entirely predictable and repeatable, and may be characterized as an increase in the incremental scale factor for increased meter reading. This error may be corrected or allowed for in a number of ways, as shall subsequently be described.

Now referring to FIGS. 4 and 5, it may be seen that the members 32 and 34 are maintained in a spaced apart relation by a plurality of spacer tubes 82 which are internally threaded adjacent the ends thereof and retain members 32 and 34 by a plurality of screws passing through the respective members and threadably engaging the spacer tubes. In the preferred embodiment, spacer tubes 82 are aluminum tubes. Cylindrical member 26, which is rotatably supported by the two members 32 and 34 in the preferred embodiment, is a plastic, hollow cylindrical member with a first end support member 86 having a shaft 88 extending into a journal 90 supported by member 32. The other end of the cylindrical member 26 is supported by a support member 92 having a gear 94 integral therewith and a shaft 96 extending through a journal 98 supported by member 34. In general, because of the difference in thermal expansion rates in the aluminum spacer tubes 82 and the plastic cylindrical member 26, the journal bearing support to the cylindrical member 26 must allow for such differential expansion. However, since meters are often used to not only measure a particular value, but to also measure or at least detect a very small change in the parameter being measured, it is desirable that the cylindrical member 26 not be allowed any substantial axial freedom with respect to members 32 and 34. Furthermore, since the band 28 is also plastic, and therefore will have a similar thermal expansion rate as the member 26, the member 26 in the preferred embodiment is actually retained with respect to member 34 by a collar 100 (FIG. 5) which effectively captures the left end of the rotating scale while the right end of member 26 is freely floating on the journal bearing formed by members 88 and 90. Thus, the scale expands and contracts with the band. Furthermore, since member 34 in the preferred embodiment is a printed circuit board and therefore also plastic, member 34 similarly expands and contracts with the length of band 28 extending from the pulley 38 to the drive roller 60 so that there is no significant change in meter reading due to differential thermal expansion between the plastic parts and the metal parts.

The central portion of member 26 having a plurality of scales thereon is a clear, plastic tube, generally frosted on the outer surface with the indicia for the various scales printed in black thereon. The zero points and the full scale points of the various scales (6 scales in the embodiment disclosed herein) are aligned in two planes perpendicular to the axis of rotation of member 26 so that all scales have the same zero point and full scale point with respect to band 26. A light may be provided to illuminate the scales displayed through the window in the front of the meter, such as the fluorescent tube 102 supported by members 32 and 34 as shown in FIG. 4. Though lighting could be provided from within member 26, this is not necessary since the effect of light diffusion through the frosted surface of the rearward facing portion of member 26 prevents the focusing of the shadow of the indicia on the back portion of the cylindrical member onto the scale displayed in the window of the meter (a fluorescent tube 102 provides a distributed light source, thereby further eliminating any tendency to focus, as hereabove described, even if the light source is placed immediately adjacent to the rear periphery of member 26).

Now referring to FIGS. 3 and 5, details of the drive system for member 26 may be seen. This drive system is very similar to the tape drive system in mechanical arrangement, with a motor 110 mounted in a manner identical to the motor 68 so that its shaft 112 is yieldably encouraged into frictional contact with a friction surface 114 on a disc 116. The disc 116 is mounted on a shaft 118 supported on a journal in member 34. On the other end of shaft 118 is a pinion gear 120 engaging the gear 94 on the end of member 26. Thus, it may be seen that motor 110 may be used to drive member 26 in rotation about its axis through the combined friction drive and gear drive.

Now referring to FIG. 9, an end view of the gear 94 on member 26 may be seen. FIG. 9 is a cross-sectional view taken along lines 9—9 of FIG. 2, substantially showing an end view of member 26. Gear 94 has a plurality of holes 120 therein which are substantially equally spaced along the arc of a circle having a center coincident with the axis of rotation of member 26. Also located on the end of gear 94 is a flexible wiper member 122 attached to the gear 94 by a pair of screws 124. The wiper member is a metallic member having a pair of wipers 126 supported thereby so as to be engageable with two circular wiper tracks on the facing surface of member 34 so as to cause electrical conduction therebetween.

Now referring to FIG. 10, a cross section of the meter taken along lines 10—10 of FIG. 2 may be seen. This view is a view of the face of member 34 which is adjacent to gear 94. It may be seen that member 34 has a single hole 128 therein located at the same radius from the axis of member 26 as the plurality of holes 120 in gear 94. Member 34 also has a conductive ring 130 concentric to the axis of member 26, having a radium equal to the radial displacement of one of wipers 126 from the same axis so as to provide continuous contact between the conductive ring 130 and the wiper member 122. Disposed concentrically with respective ring 130 and at a radius equal to the radius of the other wiper 126 are a plurality of conductive segments 132.

The number of the conductive segments 132 and the number of holes 120 in gear 94 is equal to the number of scales on member 26, which in the embodiment shown is six.

Now referring specifically to FIGs. 10 through 13, details of the mechanical and electrical interconnections of the various electrical components of the drive system for member 26 may be seen. A solenoid 140 is attached to member 34 so that the inner end 142 of the solenoid plunger extends through hole 128 in member 34. The outer end 144 of the solenoid plunger has a plastic cap 146 thereon capturing a coil spring 148 which yieldably encourages the solenoid plunger to the outward position. A pair of switch contacts 150 and 152 are disposed on a non-metallic switch body member 154 supported from member 34. When the solenoid 140 is not energized, coil spring 148 urges the plunger of the solenoid outward so as to engage switch contact 152 and force it against switch contact 150. In this position, the end of the solenoid plunger 142 is withdrawn from the surface of gear 94 as shown in FIG. 11. When the solenoid is energized, the solenoid force exceeds the spring force of coil spring 148, and end 142 of the solenoid slidably engages the face of gear 94 and, upon alignment of one of holes 120 with the end 142 of the solenoid plunger, will proceed into the hole and firmly lock member 26 in the respective angular position. Switch contacts 150 and 152 are disposed so as to be in contact with each other at all times until end 142 of the solenoid plunger passes within one of holes 120.

Now referring particularly to FIG. 13, the electrical innerconnection of these various components and their functional relation may be seen. A plurality of electrical signals to be measured are presented on an equal number of lines 150 to the stationary contacts on a rotary switch 152 so as to be individually selectable by the rotating contact in accordance with the angular position of the contact. It will be noted that in FIG. 13, eight signals are shown as being presentable to the rotating contacts for coupling to line 154. It is assumed that the signals presented on lines 150 are each DC signals normalized in accordance with the particular scale on which they are to be measured so that information derived from the scale is an accurate measure of the parameter represented by the signal. Thus, amplifiers, voltage dividers, AC/DC converters, etc., may be utilized to condition the various signals depending upon the nature of the signal prior to its presentation on the respective one of lines 150, such signal conditioning being well known in the prior art and dependent upon the signals to be measured. By way of example, if a DC signal is to be measured, it might be applied directly to one of lines 150 or amplified or scaled prior to application to the respective line. If the information in the signal to be measured is in some other form such as in the frequency of the signal, a frequency to voltage converter (FM demodulator) would be used and the output scaled to be compatible with the scaling of the meter movement. By way of example, the rpm of an automobile engine might be measured by first detecting the rate at which the spark plugs are firing and then converting this frequency into a DC signal proportional to the frequency. Also it should be noted that not all scales need have a zero on the scale, but merely should have a low end on the scale corresponding to a normalized input voltage on the respective one of lines 150 equal to zero.

Rotary switch 152 may be used to couple any of the signals on lines 150 through line 154 to a servo amplifier 156. The output of the servo amplifier is coupled to a compensating network 158 to provide damping for the servo system, and is applied to the drive motor 68 which in turn drives band 28 as hereinbefore described. Also, as hereinbefore described, motor 68 drives the wiper of feedback potentiometer 64. The winding of the potentiometer is connected to a reference voltage and the wiper is connected to the input of servo amplifier 156. The resistors 158 and 160 serve as summing (and scaling) resistors, with the motor 68 driving the tape and potentiometer to a position so that the signal from potentiometer 64 just cancels the signal applied on line 154. Typically, the compensating network 158 is a lead network and it is to be understood that the servo amplifier 156 and compensating network 158 are often combined, with the compensation being achieved by various networks in the amplifier input and feedback circuits, and that such amplifiers and networks are well known in the prior art of servo mechanisms. In the preferred embodiment, an integrated circuit amplifier and a complimentary pair output stage is used for the servo amplifier.

In the embodiment shown, there are eight signals available on lines 150 but only six scales on member 26, and therefore some of the eight signals are presumed measurable on the same scale. In the particular embodiment shown, it is assumed that the third and fifth signals are measurable on the same scale and that the sixth and eight signals are measurable on the same scale. Thus, eight signals are measurable on the six scales. When rotary switch 152 is switched to one of the positions one through eight, rotary switch 154 is moved in unison therewith. Thus, in the schematic of FIG. 13, rotary switches 152 and 154 are both in the fourth position. When first moved to this position the voltage of the power supply 162 is applied through line 164 and the moving contact of the rotary switch to the fourth segment 132d (the designation following the number 132 indicating the fourth segment of segments 132 as shown in FIG. 10). The circular contact 130 is connected to one side of the solenoid coil of solenoid 140, and since the wiper member 122 will not initially be contacting segment 132d, no power will be applied to the solenoid coil. Consequently, the return spring 148 (FIGS. 11 and 12) will encourage the plunger to the outward position, thereby closing the switch comprised of switch contact 150 and 152. These switch contacts couple the drive motor 110 for member 26 to the power supply 162, and thus member 26 is caused to rotate about its axis (in the preferred embodiment at a rate of approximately one-half of a revolution per second). It may be seen that as one of wipers 126 intercepts segment 132d, power is applied through the segment, wiper 122 and ring 130 to the solenoid coil of solenoid 140. This energizes the solenoid and causes the end 142 of the solenoid plunger to slidably engage the surface of gear 94 and to be propelled inward into the associated one of the plurality of holes 120 (e.g., the hole associated with segment 132d). When the end of the solenoid plunger extends into the hole, member 26 is locked in the respective angular position and the switch comprised of contacts 150 and 152 is moved to the open position, thereby de-energizing the drive motor 110. The solenoid 140 is a continuous duty solenoid and will remain energized to lock member 26 in the proper angular position, both to present the desired scale through the window in the front of the meter, so long as the system is energized and the rotary switch is positioned in the fourth position. When the rotary switch is moved to any other position, power to solenoid 140 will be momentarily lost, thereby allowing coil spring 148 to move solenoid to the extended position disengaging the member 26 and closing the switch to energize the drive motor member 110. Thus, member 26 is again driven in rotation until the scale associated with the one of segments 132 energized through rotary switch 154 approaches the window, at which time the member 26 will again be locked in the new position and the drive motor de-energized.

In the preferred embodiment, the segments 132 occupy an arc of approximately 15°, thereby assuring excitation of the solenoid 140 when member 26 is in the proper angular position and making to the exact placement of wiper 122 and segments 132 generally noncritical.

From the above description, it may be seen that drum 26, when moving to a new scale, will always rotate in the same direction and will rotate less than one full revolution before stopping at the new scale selected in accordance with the position of the rotary switches. It may be seen also that connection of the fifth stationary contact with the third stationary contact, as shown in FIG. 13, for the rotary switch 154 will cause the same scale to be selected when the rotary switches are in the third and fifth position. Similarly, the same scale will be selected when the rotary switches are in the sixth and eighth position, allowing the random selection of eight signals to be measured on a total of six scales to be associated therewith. Also, it can be seen that the only connection between the rotary switches 152 and 154 and the associated mechanism of the meter is an electrical connection so that the rotary switches 152 and 154 may be positioned remotely from the meter, such as, by way of example, on a hand-held control unit connected by means of a cable to the meter. Such operation of the meter is most convenient, since the scales are in general large and easily read and not subject to confusion since only one scale is presented at one time. Furthermore, since paralax is substantially eliminated, a scale may be easily read from substantially any frontal position so as to allow the remote selection of parameter to be measured and the associated scale on which it is to be measured, followed by the easy reading of the appropriate scale from substantially any position in the room in which the meter is located.

Having now described the basic structure and operation of the preferred embodiment of the present invention, a potential source of error, hereinbefore briefly referred to, and various methods of eliminating this error will now be described in detail. As previously mentioned, for each rotation of the band drum 46, the apparent diameter of the drum increases by twice the thickness of the band. Since the drum is approximately one-half of an inch in diameter and the band in the preferred embodiment is two-thousandths of an inch thick, the drum diameter increases by approximately 0.8 percent per revolution (with full scale representing somewhat over 6 turns of the drum). Thus, after one turn of the drum, the effective incremental scale factor of the meter increases by 0.8 percent, and will increase 0.8 percent for each subsequent turn. Consequently, for the initial turn, there will be an initial scale factor which shall incrementally increase for the next six turns by 0.8 percent per turn, or approximately 4.8 percent overall.

The tape motion versus drum rotation will be approximately as shown in curve 200 of FIG. 14, which is a plot of theoretical band position versus drum rotation, and is made up of a plurality of straight line segments, each having a slope of 0.8 percent greater than that of the preceding segment (the 0.8 percent is shown in an exaggerated manner, for purposes of illustration only). (It will be noted that each revolution of the drum is 1 ½ inches in tape motion, so that a ten inch scale corresponds to 6⅔ revolutions of the drum.) If a straight line, indicated in phantom as line 202, is drawn between the full scale position and the zero position, it will be noted that the segment of line 200 between revolution 3 and 4 is substantially parallel to lines 202 (if 7 full revolutions represent full scale, such segments would be exactly parallel, at least theoretically, to line 202). Thus, in accordance with the previous discussions, the slope (e.g., incremental scale factor) of the segment between the third and fourth revolution of the drum is substantially equal to the slope of lines 202, the incremental scale factor between the second and third revolution is 0.8 percent different than that of line 202, the incremental scale factor between the first and second revolutions is 1.6 percent different and between the zero and first revolution is 2.4 percent different. Thus, for approximately one-seventh of full scale, there is a deviation in tape motion from a theoretical line 202 by 2.4 percent, a deviation of 1.6 percent for the next one-seventh of full scale and a further deviation during the third seventh of full scale of 0.8 percent. For the next one-seventh of the scale motion, there is no substantial further deviation and from thereafter the deviation decreases back to zero at full scale. Consequently, the maximum deviation from the theoretical line 202, generally between the third and fourth drum revolution, is approximately $1/7 \times 2.4 + 1/7 \times 1.6 + 1/7 \times 0.8$ or approximately 0.7 percent of full scale. Thus, the maximum deviation from the theoretical line 202 occurs generally in the vicinity of mid-scale and has a value of approximately 0.7 percent of full scale.

To correct for the above error, it should be noted first of all that the maximum error may be caused to not exceed 0.35 percent by merely calibrating the meter so that it reads high by 0.35 percent of full scale both at the zero reading and at the full scale reading. However, the error generally indicated in FIG. 14 may be easily reduced to an insignificant value by any one of a number of methods. By way of example, the various scales on member 26 may be laid out with a compensating nonlinearity so that the meter reads correctly at any tape position, though the space between increments is slightly greater at the higher readings. The amount of nonlinearity is not generally visible or apparent to the person using the meter, and does not affect a person's ability to interpolate between scale devisions.

Another method of correcting for the above error which does not utilize nonlinear scales may be accomplished by a proper selection of appropriate resistors to be used in a network with potentiometer 64. In particular, it is to be noted that the deviation of band position versus drum rotation from the theoretical curve 202 is a negative deviation. Consequently, by causing the feedback signal from potentiometer 64 to be depressed in a similar manner, the drum rotation may be caused to be increased by a compensating amount in the lower regions of the meter movement, thereby resulting in a substantially linear tape motion versus input signal. This may be achieved by the use of various resistors in conjunction with potentiometer 64, such as resistor 300 and 302 shown in FIG. 13. By way of example, if resistor 300 is chosen to have a resistance equal to approximately three-fourths of the resistance of potentiometer 64, the maximum deviation or depression of the potentiometer output may be caused to occur at approximately 3 ½ revolutions of the potentiometer (for a 10 turn potentiometer). Thus, the general shape of the output curve of the potentiometer due to the loading thereon may be cause to have a shape closely approximating to shape of curve 200 in FIG. 14. The midpoint of the curve for the potentiometer output is matchable to the curve 200 by the appropriate selection of the loading resistor 302 in accordance with the potentiometer resistance and the impedance caused by the input network to the servo amplifier 156. Consequently, the zero point, the midpoint and the full scale point for the meter band position may be caused to have substantially zero error, and the maximum deviation or error occurring therebetween reduced to a very small fraction of the 0.7 percent of full scale. This and other methods of generally obtaining a desired nonlinearity in the output of a linear potentiometer are well known in the prior art and are described in a number of references on the subject, such as by way of example, "Electro Mechanical Components For Servo Mechanisms" by Davis and Ledgerwood, a 1961 McGraw-Hill Book Co., Inc. publication, starting on page 58 thereof. Of course, a nonlinear feedback potentiometer would achieve the same purpose, though only at a much greater expense and without substantially improved characteristics.

It may be thus seen that by the appropriate selection of two resistors, the feedback of potentiometer 64 may be controlled in a manner to result in a linear band movement versus meter input voltage to within approximately 0.1 percent of full scale. Thus, the accuracy of the meter becomes more dependent on such parameters as the stability of the reference voltage for potentiometer 64 and the thermal and mechanical stability of the various components of the meter. In this regard, the construction of the meter to minimize the inaccuracies in reading due to the differential expansion of the various components of the meter and to minimize the end play in the member 26 containing the scales thereon has been previously described in detail. Thus, the accumulation of these various errors may be maintained to less than approximately one-quarter of 1 percent of full scale.

Another source of error in the meter of the present invention is the friction in the band drive motor caused primarily by the brushes in the motor, as well as friction in the other components of the band drive system. This, however, may be readily minimized by the proper design of the servo amplifier 156. Specifically, if high gain amplifiers are used (with proper compensation) a relatively high motor drive signal may be created as a result of a very small error signal between the signal to be measured and the potentiometer feedback signal. Also, a high gain operational amplifier connected so as to serve as an integrator having a long time constant may be used as part of the servo amplifier. Such an amplifier performs as an integrator at very low frequencies, so as to integrate even a small error so as to eventually (in the order of one second) cause a sufficient output to overcome the friction in the drive system and advance the band to a better null position. Such an integrator typically will be designed so as to have negligible gain and phase shift at the resonant frequency of the servo drive system so as to not affect the compensation thereof.

There has been described hereinabove a servo meter having a plurality of remotely selectable scales which may be readily fabricated and assembled to provide a meter having substantially no paralax with an accuracy of readings of one-half of one percent of full scale or less. The meter may be generally fabricated of relatively inexpensive components using standard drive motors, feedback potentiometers, gears, etc., and easily calibrated to provide the desired accuracy. In the previously disclosed embodiment, member 34 on which substantially all of the electrical components of the meter are mounted is a double clad printed circuit board with the rings 130 and segments 132 formed therein by conventional printed circuit etching techniques. Thus, the construction of the meter of the previously disclosed embodiment makes maximum use of standard components and manufactured techniques to result in a low cost meter of very good accuracy and exceptional ease and flexibility of use.

Now referring to FIGS. 17 through 23, various views of and the circuit diagram for an alternate embodiment of the present invention may be seen. This embodiment is substantially the same as the prior embodiment except for the specific mechanism used for driving the band and the cylindrical member and the electrical connection of the various components thereof. Thus, in the figures to follow, only those aspects of this embodiment which vary from the previously described embodiment are described, it being understood that the general organization and the end result achieved with the two embodiments are the same.

Figure 16:
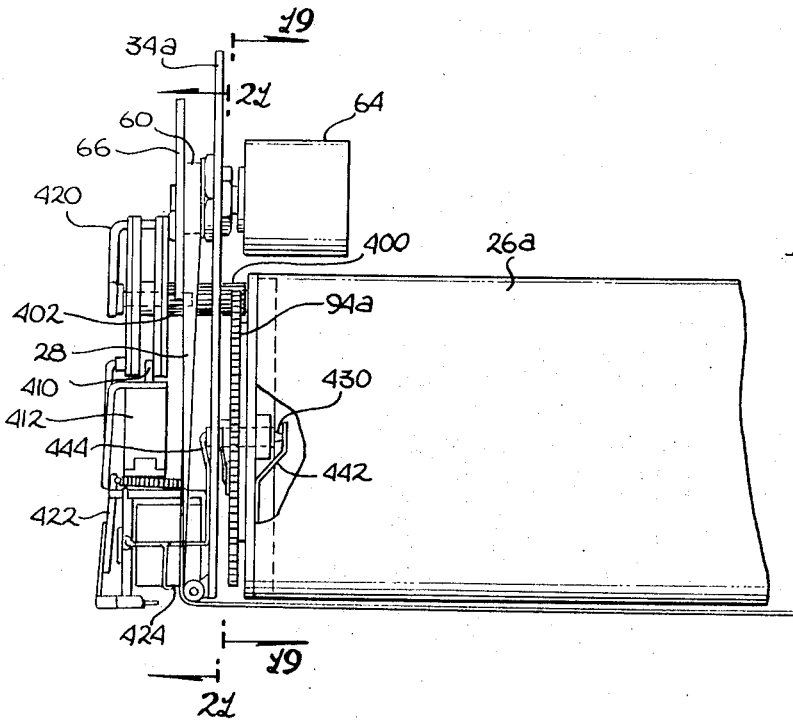
FIG. 16 is a stop view of the end of the alternate embodiment taken along the lines 16—16 of FIG. 15.
Figure 17:
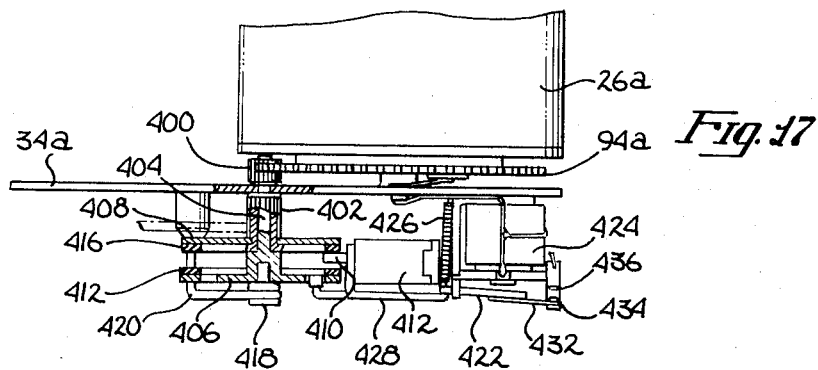
FIG. 17 is a partial cross-sectional view of the alternate embodiment taken along lines 17—17 of FIG. 15.

Now referring to FIGS. 15, 16 and 17, details of the band drive may be seen. As before, a potentiometer 64 is mounted to an end member 34a and has a drum 60 and a gear 66 which drive the potentiometer in rotation. The band 28 is wrapped around drum 60 so as to be driven in unison with the potentiometer. The cylindrical member 62a has a gear 94a on the end thereof as before which engages and is driven by a smaller gear 400. Mounted coaxially with the gear 400 is a second small gear 402 which engages gear 66 on the potentiometer to drive the potentiometer. Gears 400 and 402, though coaxial, are separately driven, which may be best seen in FIG. 17. Thus, it may be seen that gear 400 is attached to shaft 404 which has a disc 406 attached to the outer end thereof. Gear 402 is rotatably supported by means of a simple journal bearing on the shaft 404 and has a disc 408 attached thereto. The two discs are spaced apart by a distance greater than the diameter of the shaft 410 on motor 412 and have rubber coated friction facings 414 and 416 disposed opposite each other so as to be engagable with the motor shaft. Thus, it may be seen that with the motor 412 resting against the friction face 416, the motor will drive disc 408 and thus the potentiometer and band through gears 402 and 66. To provide greater support for the outer end of shaft 404, a journal bearing 418 is supported by member 420 from member 34a.

The motor 412 is supported by the moving member 422 of a relay type device 424 and is elastically encouraged into engagement with friction surface 416 as shown in FIG. 17 by coil spring 426. Also supported by the moving element 422 is a wire member 428 which is generally engagable through either a pair of holes in the face of disc 406, specifically holes 430 as may be better seen in FIG. 15. Also attached to moving member 422 is a moving switch contact 432 which switches between fixed contacts 434 and 436.

When the relay 424 is not excited, member 428 engages one of the holes in the cylindrical member drive disc 406 while the motor engages disc 408 to drive the band to the desired position. When the relay 424 is excited, the motor shaft 410 is caused to move outward against the friction face 414 as may be seen in FIG. 18 and simultaneously therewith, member 428 is withdrawn from the hole 430. Also, of course, the moving element 432 moves from a position in contact with the fixed contact 434 to contact with fixed contact 436. Thus, upon excitation of the motor, the cylindrical member 26a will be caused to be driven in rotation.

Now referring to FIGS. 16, 19 and 20, details of the end of cylindrical member 26a and the support thereof may be seen. Gear 94a is a metallic gear (aluminum in the preferred embodiment) and supports a tubular plastic member forming the cylindrical outer surface of cylindrical member 26a. The gear 94a is supported on a self-lubricating plastic journal 438 which has a nonrotating metal pin 440 extending coaxial therethrough. Attached to gear 94a is a metallic contact 442 which makes electrical contact with the metal pin 440 so that electrical connection is made to the face of gear 94a through wire 444. Also mounted on the face of gear 94a is a single plastic (nonconductive) plug 446, the function of which shall be subsequently described.

Now referring to FIG. 21, the face of member 34a abutting the face of gear 94a may be seen. Mounted on member 34a are a plurality of wipers 450. Each of these wipers is connected to a wire 452 so as to make available separate electrical contact to each of the wipers. The wipers are equally spaced at a radius equal to the radius of plastic member 446 on gear 94a and are disposed so as to normally make wiping electrical contact with the face of gear 94a unless interrupted by the passage of the plastic member 446 thereunder. Thus, as shown in FIG. 21, wiper 450a is connected to wire 452a and is interrupted from electrical contact by plastic plug 446, shown in phantom, while the other wipers such as wiper 450b continues to make electrical contact with the gear. Thus, electrical continuity exists between wire 444 (FIG. 20) and each of the wiper connections 452 unless the specific wiper connection is interrupted by the plastic plug.

Figure 23:
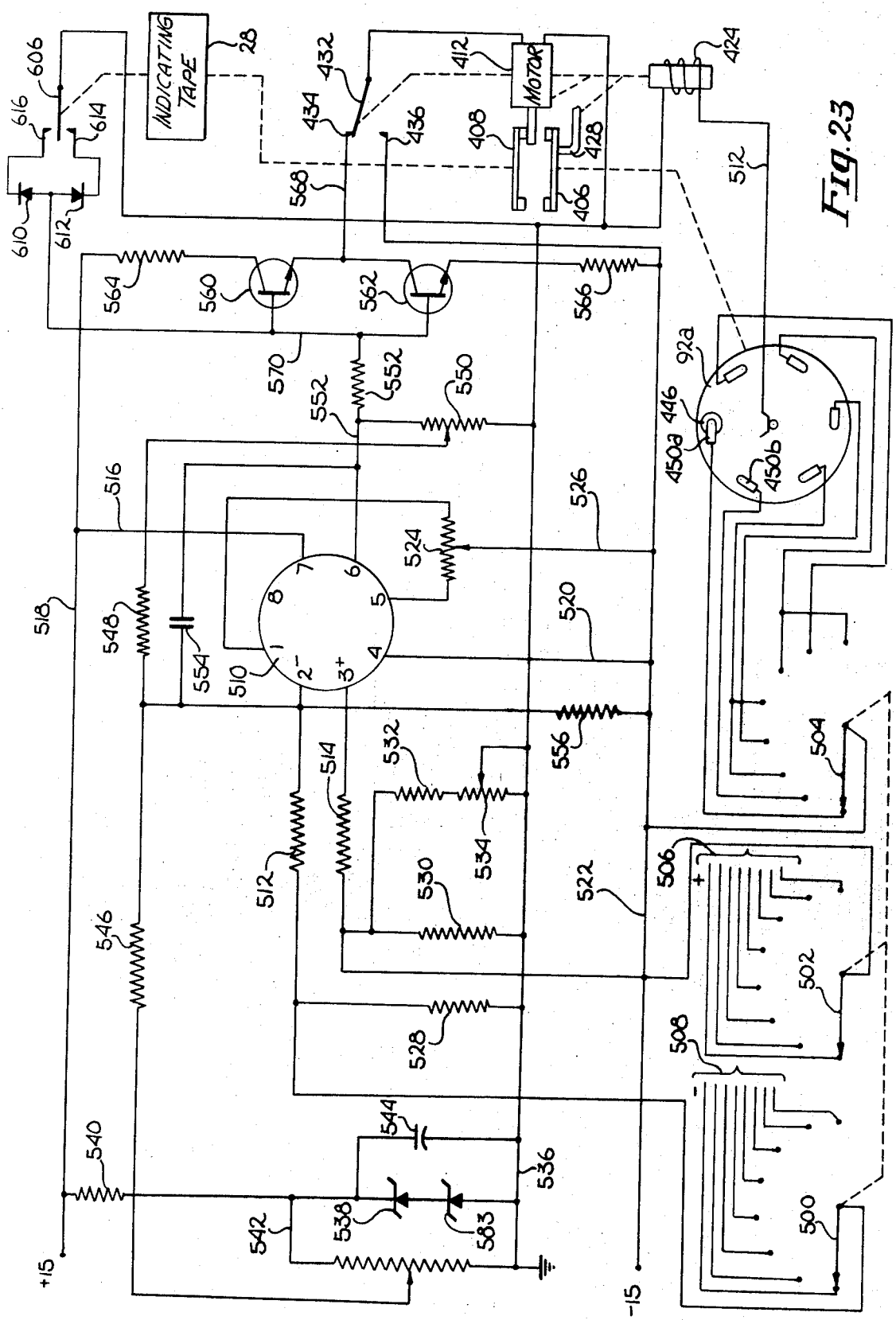
FIG. 23 is a schematic diagram illustrating the operation of the various electrical components of the alternate embodiment meter.

Now referring to FIG. 23, a schematic diagram of the electrical interconnection of the various components of the embodiment of FIGS. 15 through 22 may be seen. This embodiment uses both plus and minus inputs so that a common ground between the various signals to be measured is not required. Three gang switches 500, 502 and 504 are mechanically coupled together and operated in unison, two of which select the parameter to be measured and the remainder of which causes the meter to change to the appropriate scale.

Eight signals may be measured in this embodiment, with the positive line of each of the signals being connected to one of lines 506 and the negative of each of the eight signals being connected to the respective one of lines 508. Thus, the positive and negative connection to any of eight signals may be applied to the input terminals 2 and 3 of operational amplifier 510 through resistors 512 and 514. Operational amplifier 510 in this embodiment is a Fairchild 741, manufactured by Fairchild Semiconductor, Mountain View, Calif., though substantially any of the integrated circuit operational amplifiers presently available may be used with only minor modification of the circuit of FIG. 23.

Terminal 7 of the amplifier is coupled to a plus 15 volt power supply through lines 516 and 518. Terminal 4 is coupled to a minus 15 volt power supply connection through lines 520 and 522, and terminals 1 and 5 are coupled together through potentiometer 524, with the wiper of the potentiometer coupled to the minus 15 volt power supply connection through line 526. Resistor 528 provides the desired input impedance for signals applied on line 508, and resistors 530 and 532 together with potentiometer 534 provides the equivalent input impedance for the signals on line 506, and further provide a means of adjustability of that load to assure proper matching of the plus and minus input characteristics of the servo amplifier.

Connected between positive power line 518 and the ground line 536 are a pair of Zener diodes 538 and resistor 540. The Zener diodes provide a reference voltage at point 542 of approximately 12 volts for applying to the potentiometer 64. Two 6 volt Zener diodes are used rather than one 12 volt Zener diode as the lower voltage Zeners exhibit better temperature stability. Capacitor 544 is also provided to better filter the reference voltage for the potentiometer. The feedback signal from the potentiometer wiper is applied through resistor 546 to the negative input terminal, that is terminal 2 of the operational amplifier. Also connected to the input terminal through resistor 548 is a signal derived from the wiper of potentiometer 550 which provides a feedback signal which is controllably dependent on the output of the amplifier on line 552. Thus, if the wiper of potentiometer 550 is in the upper position, a maximum feedback proportional to the output of the amplifier is derived, whereas if the wiper is in the lower position, the wiper is substantially connected to ground and no feedback is achieved. Also connected between line 552, that is, the amplifier output, and the negative input for the amplifier is a capacitor 554 which provides the required lead to stabilize the system.

A resistor 556 is connected between the negative input terminal for the amplifier 510 and the negative power supply line 522. This resistor, a relatively high valued resistor, slightly negatively biases terminal 2 of the amplifier so that the zero output of the mplifier for zero input may be readily adjusted through potentiometer 524.

Coupled to the output of the amplifier on line 552 through resistor 558 are the bases of the complimentary pair of transistors 560 and 562. The collector of transistor 560 is coupled to the positive power supply terminal through current limiting resistor 564 while the emitter of transistor 562 is coupled through current limiting resistor 566 to the negative power supply line. Thus the output of the amplifier on line 568 will follow the voltage on the bases of the two transistors, specifically the voltage on line 70. Line 568 is connected to the fixed contact 434 as was previously shown with respect to FIG. 17.

It may be seen that when the moving member of switches 500, 502 and 504 are in the position shown, the first of the eight signals is applied to the plus and minus input of the operational amplifier through resistors 512 and 514. At the same time, minus 15 volts is applied through switch 504 to wiper 450a but this power is not applied through line 572 to excite the relay 424 because of the insulation of the wiper from the face of gear 92a by the plastic plug 446. Consequently, motor 412 is in frictional engagement with disc 408. Furthermore, the output of the amplifier on line 568 is applied to the motor through fixed contact 434 and moving contact 432. Thus the indicating tape 28 is driven to a null position determined by the feedback of the potentiometer 64 to null the servo system.

When the wiper of switches 500, 502 and 504 is moved to the next position, the second of the eight input signals to be measured will be applied to the input of the amplifier. At the same time, minus 15 volts will be applied to wiper 450b and through the center contact to line 572, thereby actuating relay 424. This causes motor 412 to effectively move downward, withdrawing member 428 from disc 406 and putting the motor shaft into frictional engagement with that disc. At the same time, moving member 432 of the switch attached to the relay is moved downward to make contact with fixed contact 436, thereby connecting minus 15 volts directly across the motor input. Thus the motor drive disc 406 and the cylindrical member 26a driven thereby until the plastic plug 446 passes under the wiper 450b. When this occurs, power to relay 424 is interrupted. However, member 428, not yet in alignment with one of holes 430 in disc 406 slides along the surface of the disc until the next hole is reached (member 428 is preferably provided with a self-lubricating plastic tip to minimize the friction in the sliding action). Until member 428 slides into one of holes 430, motor 412 remains in driving frictional engagement with disc 406 to drive the disc until member 428 falls into position, thereby locking the disc and further allowing the motor and moving member of switch 432 to return to the positions shown in FIG. 23 so as to now drive the tape to the new null position. (To achieve the above result, the motor 412, as well as members 428 and 432 are substantially, independently mounted to the moving member of relay 424 through somewhat selectively compliant mountings, so that when relay 424 is actuated, the motor 412 will first be brought into engagement with disc 406 and then upon the further travel of the moving member of the relay against the compliant mounting of the motor, member 428 will be withdrawn from the hole 430. When power is removed from the relay 424, which has a return spring with a return force substantially less than the compliance of member 428. The compliance of member 428 as well as the mounting of motor 412, will cause the motor to remain elastically encouraged against disc 406 and switch member 432 against fixed contact 436 until member 428 falls into the respective next hole 430).

Commercially available potentiometers suitable for use as potentiometer 64 in the present invention typically have stops provided therein to limit the range of rotation of the potentiometer shaft to ten turns. However, if these stops are used as the stops to determine the maximum limit of band travel, the repeated hitting of the stops tends to cause a slight rotation of the potentiometer case leading to an offset or inaccuracy in the meter reading. Therefore, it is desirable to provide other means of stopping the band motion. The means used in this embodiment is that shown in FIG. 22 and schematically in FIG. 23. As before, the band takeup drum 46 is yieldably encouraged into rotation by a cord 600 passing over a pulley 602 to be connected to the instrument frame through a coil spring 604. The cord 600 is coupled to the coil spring 604 through a metallic ring 606, and is in electrical contact with wire 608 through the coil spring. A pair of diodes 610 and 612 are connected to line 570, and further are connected to members 614 and 616 projecting outward to engage ring 606 at either end of the desired band drive motion. Thus, as may be seen in FIG. 23, when the output of the amplifier on line 568 is positive the motor 412 will drive the band until the ring 606 contacts member 616 (assuming a servo null does not sooner occur). This shorts out the voltage on line 568 applied to the motor to substantially zero, thereby terminating the motor excitation. However, whenever the output of the amplifier swings negative, the voltage on line 570 is decoupled from ring 606 by diode 610 and therefore the amplifier is free to drive the band to a lower scale position, being limited in the lower extreme by the equivalent action of diode 612. Thus, it may be seen that the band motion may be limited to something greater than full scale, but something less than that limited by the stops in the potentiometer. In that regard, it is to be noted that the zero scale position generally corresponds to some positive feedback signal on the wiper of potentiometer 64 since the potentiometer is not at a stop, and therefore resistor 556 provides a negative signal to balance this positive zero point value. Thus, the amplifier zero may be adjusted by potentiometer 524. The amplifier scale factor may be adjusted by potentiometer 550 and the zero point in the band position may be adjusted by loosening the potentiometer case and rotating the case with the amplifier input shorted so as to allow the band to follow the potentiometer case to the desired zero null position.

The embodiment of the present invention hereabove described has the specific advantage of being simpler in construction and requiring only a single motor drive means to achieve the desired objects of the present invention. However, while the invention has been particularly shown and described with reference to two embodiments thereof, it will be understood by those skilled in the art that various changes in form and details may be made therein without departing from the spirit and scope of the invention.

I claim:

1. In a servo driven meter, having at least one scale, a servo drive means, a band having first and second ends, and a takeup means, said band being substantially transparent in part and at least partially opaque in part, thereby defining a visually distinctive indicium along the length of said band, a portion of said band being disposed along and adjacent said scale with the first end of said band being attached to said servo drive means, said servo drive means being a means for rolling up and dispensing said band in response to an electrical signal being applied to said servo drive means, said takeup means being attached to said second end of said band and being a means for yieldably applying tension to said hand, said servo drive means having a servo drive motor, a servo amplifier and a potentiometer, said potentiometer having a drum on the shaft thereof, said drum being adapted to roll up and dispense said band in response to the rotation of said shaft, said servo drive motor being coupled to said shaft and adapted to cause rotation thereof in response to an electrical drive signal applied to said motor, said servo amplifier being coupled to the wiper of said potentiometer and adapted for coupling to a signal to be measured, said servo amplifier further being coupled to said drive motor and adapted to provide a drive signal thereto responsive to the difference in said signal to be measured and the signal received from said wiper, said takeup means having a second drum-like member adapted for rotation about its axis, said second drum-like member being disposed for rolling up and dispensing said band from said second end, said second drum-like member further having an area on which a flexible member is wound in opposition to the direction said band is wound on said second drum-like member, said flexible member being attached to the frame of said meter through a tension spring so as to yieldably urge said second drum-like member into rotation to wind up said band.

2. In a meter, an electrical drive means, a selection means, a scale member and a means for providing a visually distinctive indicium responsive to an electrical signal applied thereto, said scale member being a substantially cylindrival member adapted for selective rotation about its axis and having a plurality of scales thereon each substantially parallel to said axis, said means for providing a visually distinctive indicium being disposed to provide said indicium in relation to one scale on said scale member determined by the selective rotation of said scale member, said electrical drive means being mechanically coupled to said scale member and being responsive to predetermined electrical signals so as to rotate said scale member to display a selected one of said scales in relation to said indicium in response to said predetermined electrical signals, said electrical drive means having a drive motor, a commutating means, a switch means and an electromechanical engaging means, said drive motor being coupled to said scale member and adapted to drive said member in rotation, said drive motor being coupled to an electrical power source through said switch means, said electro-mechanical engaging means being a means for engaging said scale member at any of a plurality of predetermined positions in response to an electrical signal applied thereto, said switch means being coupled to said electro-mechanical engaging means and operative to interrupt electrical connection of said motor to said power source when said electro-mechanical engaging means engages said scale member at any of said predetermined positions, said commutating means being responsive to said predetermined electrical signals and being a means of providing an electrical signal to said electro-mechanical engaging means when said scale member is at one of said predetermined positions as determined by one of said predetermined electrical signals.

3. A servo driven meter with electrically selectable scales comprising:
a scale member, said scale member having a generally cylindrical shape with a plurality of scales on the surface and generally parallel to the axis thereof, said scale member being adapted for rotation about its axis,
a band having first and second ends, said band being substantially transparent in part and at least partially opaque in part, thereby defining a visually distinctive indicium along the length of said band, a portion of said band being disposed generally parallel to said axis of said scale member and adjacent the normal position of one of said scales,
a servo drive means coupled to said first end of said band, said servo drive means being comprised of a servo drive motor, a servo amplifier and potentiometer, said potentiometer having a drum on the shaft thereof, said drum being adapted to roll up and dispense said band in response to the rotation of said shaft, said servo drive motor being coupled to said shaft and adapted to cause rotation thereof in response to an electrical drive signal applied to said motor, said servo amplifier being coupled to the wiper of said potentiometer and adapted for coupling to a signal to be measured, said servo amplifier further being coupled to said drive motor and adapted to provide a drive signal thereto responsive to the difference in said signal to be measured and the signal received from said wiper,
a takeup means, said takeup means having a second drum-like member adapted for rotation about its axis, said second drum-like member being disposed for rolling up and dispensing said band from said second end, said second drum-like member further having an area on which a flexible member is wound in opposition to the direction said band is wound on said second drum-like member, said flexible member being attached to the frame of said meter through a tension spring so as to yieldably urge said second drum-like member into rotation to wind up said band, and
an electrical drive means mechanically coupled to said scale member, said electrical drive means comprising a drive motor, a commutating means, a switch means and an electromechanical engaging means, said drive motor being coupled to said scale member and adapted to drive said member in rotation, said drive motor being couplable to an electrical power source through said switch means, said electromechanical engaging means being a means for engaging said scale member at any of a plurality of predetermined positions in response to an electrical signal applied thereto, said switch means being coupled to said electromechanical engaging means and operative to interrupt electrical connection of said motor to said power source when said electromechanical engaging means engages said scale member at any of said predetermined positions, said commutating means being responsive to predetermined electrical signals and being a means of providing an electrical signal to said electromechanical engaging means when said scale member is at one of said predetermined positions as determined by one of said predetermined electrical signals.

4. The meter of claim 3 further comprised of first and second remote switches operative in unison, said first remote switch means being coupled to a plurality of signals and to said servo amplifier, and being operative to selectively couple any of the last named said plurality of signals to said servo amplifier, said second switch means being coupled to said commutating means and operative to couple any of said predetermined signals thereto in response to the setting of said first and second remote switches.

5. A servo driven meter with electrically selectable scales comprising:
- a scale member, said scale member having a generally cylindrical shape with a plurality of scales on the surface and generally parallel to the axis thereof, said scale member being adapted for rotation about its axis;
- means for providing a visually distinctive indicium relative to said scale member;
- a drive motor;
- a servo amplifier;
- an electromechanical means movable between first and second positions in response to an electrical signal;
- first drive means mechanically driveable by said drive motor to drive said scale member in rotation;
- second drive means mechanically driveable by said drive motor to drive said visually distinctive indicium;
- potentiometric means coupled to said visually distinctive indicium for providing a potentiometric signal responsive to the position of said indicium;
- means coupled to said scale member for providing, in response to electrical switching signals, any one of a plurality of electrical signals to said electromechanical means, each having a first electrical characteristic when a corresponding one of said plurality of scales is generally aligned with said visually distinctive indicium to cause said electromechanical means to move to said first position and a second electrical characteristic when not generally aligned with said corresponding one of said plurality of scales to cause said electromechanical means to move to said second position;
- means for coupling any of a plurality of signals to be measured to the input of said servo amplifier and simultaneously coupling a corresponding said electrical switching signal to said means coupled to said scale member;
- switching means coupled to said electromechanical means, said drive motor also being coupled to said electromechanical means so as to engage said first drive means when said electromechanical means is in said second position and to engage said second drive means when said electromechanical means is in said first position, said switching means being coupled to said drive motor and operative to apply drive power to said motor when said electromechanical means is in said second position and to couple said drive motor to the output of said servo amplifier when in said first position, said servo amplifier providing an output responsive to the potentiometric signal and one of said signals to be measured.

6. The meter of claim 5 further comprised of a limiting means, said limiting means being a means for preventing the application of drive power to said drive motor to drive the said visually distinctive indicium beyond first and second predetermined limits of motion.

7. The meter of claim 5 wherein said first and second drive means are engagable by said drive motor through frictional drive means.

8. The meter of claim 5 further comprised of a stop means, said stop means being coupled to said electromechanical means and operative to engage said first drive means and prevent further motion thereof when said electromechanical means is in said first position.

9. The meter of claim 8 wherein the moving portion of said electromechanical means is yieldably encouraged to said first position by spring means, said moving portion being movable to said second position upon application of an electrical signal, said drive motor being yieldably supported by said moving portion so as to engage said first drive means before said stop means releases said first drive means so that said drive motor may continue to drive said first means, after the electrical signal is removed from said electromechanical means, until said stop means engages a predetermined portion of said first drive means, whereby said moving portion may return to said second position.

10. The meter of claim 9 wherein said means coupled to said scale member for providing any one of a plurality of electrical signals comprises an electrically conductive surface on the end of said scale member and a plurality of wiper contacts stationarily disposed at predetermined locations at a radius about the axis of rotation of said scale member so as to contact said face, said face having one additional electrical contact thereto and further having a nonconductive member at said radius, whereby the electrical power applied to any of said wiper contacts will be communicated to said additional electrical contact until said scale member rotates so that said nonconductive member intercepts the corresponding said wiper contact.

* * * * *